United States Patent Office 2,922,637
Patented Jan. 26, 1960

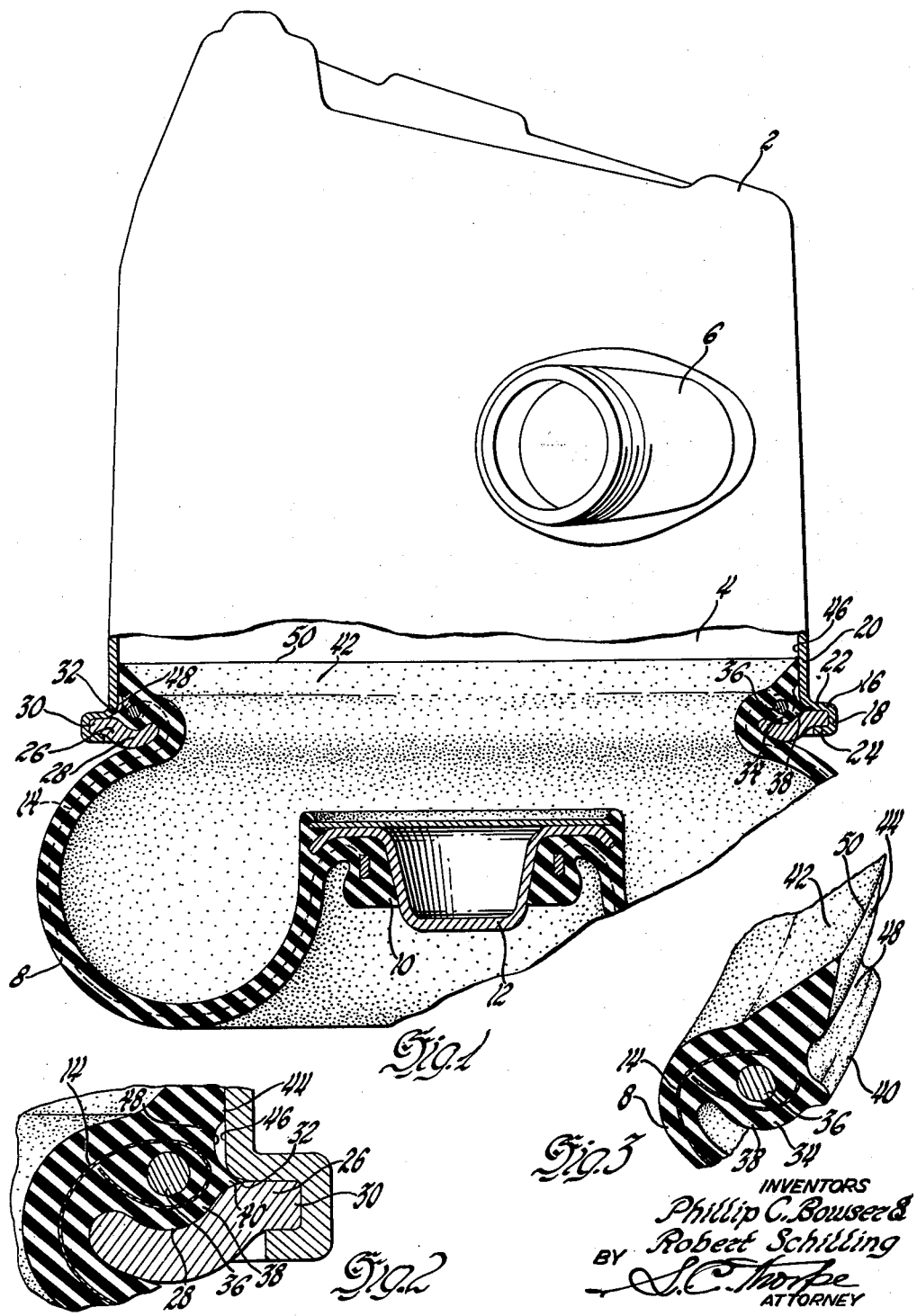

2,922,637

AIR SPRING BELLOWS

Phillip C. Bowser, Mount Clemens, and Robert Schilling, Bloomfield Hills, Mich., assignors to General Motors Corporation, Detroit, Mich., a corporation of Delaware Application May 29, 1957, Serial No. 662,399

4 Claims. (Cl. 267—65)

This invention relates generally to automobile pneumatic suspensions and particularly to the connection and seal between the container and diaphragm making up the air bellows assembly of such suspensions.

Considerable difficulty has been encountered in providing an effective connection and seal between the upper metallic container and the flexible diaphragm making up the air bellows assemblies. Flexing of the diaphragm during its use tends to cause the end of the diaphragm to pull away from sealing engagement with the wall of the upper container, thereby reducing the effectiveness of the connection and the seal. The present invention serves to obviate such difficulties by the provision of a unique bead provided on the diaphragm seal and an unusual grooved corner connection of the container which cooperate to reduce any tendency for the seal to be broken between the sealing surfaces of the diaphragm and container.

For a better understanding of the invention and the objects thereof, reference may be had to the accompanying detailed description taken in conjunction with the single sheet of drawings, in which:

Fig. 1 is a view in elevation with portions broken away and in section of an automotive vehicle air suspension spring or bellows assembly including the upper metallic container and the lower cup-like diaphragm with the novel connection and seal therebetween.

Fig. 2 is an enlarged view in section of that portion of Fig. 1 which illustrates the details of the connection and seal between the lower end of the upper container and upper end of the diaphragm.

Fig. 3 is a perspective view of the upper end of the diaphragm showing the configuration of the bead forming such end.

Referring now to the three figures, an upper container 2 which forms the upper part of an air bellows assembly or air spring for an automotive vehicle suspension is shown. This container has a hollow interior 4 to which air may be supplied or exhausted via the piping or port 6. A lower cup-shaped diaphragm 8 is fixed (in a manner to be described in detail shortly) to the upper container 2 and forms therewith the air containing portion of the automotive vehicle air suspension spring. The lower end 10 of the diaphragm is closed by a plate assembly 12 which forms no part of the present invention and which is connected to the unsprung portion of the vehicle and serves to operate the leveling valve (not shown) which supplies or exhausts air to and from the air bellows assembly in response to deflection between sprung and unsprung portions of the vehicle.

Normally, these diaphragms include a multiplicity of plies of cord fabric, only one of which is shown in the present embodiment and indicated by a numeral 14. These plies such as that indicated by numeral 14 are, of course, for the purpose of reinforcing and strengthening the diaphragm. While such plies are necessary for obtaining a diaphragm capable of withstanding constant flexure and pressures applied thereto, they have also created certain problems in maintaining a proper connection and seal between the lower end of the container 2 and the upper end of the diaphragm. For example, when the diaphragm is flexed particularly downwardly, there is a tendency for the entire diaphragm to pull downwardly away from the container 2. This results in the end of the diaphragm pulling away from the surfaces of the container 2 which it engages, thereby breaking the seal and spoiling the connection.

In the present invention, however, it will be noted that the lower end of the container 2 is provided with a channel 16 having a web 18 offset from the lower cylindrical wall 20 of the container. The channel in cross-section is made up of a pair of legs 22 and 24 which extend generally perpendicular to wall 20 and web 18. Anchored in channel 16 is an annular inwardly extending ring or washer 26 which forms an inwardly facing flange on the lower end of container 2. The ring or washer 26 has a dished portion 28 spaced from its end 30 anchored in channel 16 whose purpose will appear shortly. It will be observed that the washer or ring 26 cooperates with the upper leg 22 and wall 20 to form an annular groove or recess 32 at the lower end of container 2.

Referring now particularly to Fig. 3, it may be seen that the upper end of the cup-shaped diaphragm 8 is necked down and provided with a bead 34 which forms an outwardly extending flange on the upper end of diaphragm 8. Bead 34 includes a reinforcing wire 36 which is imbedded in the end thereof. Below the wire 36 the bead is bulbous in form as seen at 38. In Fig. 3 it is shown that the one ply corded fabric 14 is imbedded and extends between the inner and outer surfaces of the diaphragm 8 and extends over the reinforcing member 36 but terminates short of reintersecting itself. Included as a part of bead 34 is a rib or ridge 40 more or less circular in cross-section, which extends laterally outwardly for a purpose which will appear shortly. The bead 34 also extends upwardly in the form of a tapered ring 42 having an outwardly facing surface 44 adapted to engage the inwardly facing surface 46 on wall 20 of container 2. Surface 44, however, has been relieved by an annular cut-out or groove 48 which is located between ridge 40 and the upper tip or end 50 of the tapering ring 42, for a purpose shortly to appear.

Referring now, particularly to Figs. 1 and 2, it will be observed that the bulbous portion 38 of bead 34 rests in the dished portion 28 and is anchored therein by reinforcing member 36 so that rib or projection 40 is located and anchored in groove 32. Surface 44 of the tapered ring section 42 sealingly engages inwardly facing surface 46 of wall 20 of upper container 2. The construction thus far described provides a strong connection and seal between the lower end of container 2 and the upper end of diaphragm 8. If the diaphragm 8 is flexed, particularly downwardly, the forces will tend to follow the lines of the cord fabric 14. This tends to "unwind" the bead, further driving the ridge 40 into the groove 32, thereby increasing the effectiveness of the seal which operates similar to an O-ring seal. In addition, the seal between surfaces 44 and 46 of the tapered ring 42 and wall 20, respectively, of the container 2 is retained by reason of the relief in the form of groove 48 between projection 40 and the upper end 50 of the tapered section. The "pull" of the diaphragm wall tends to occur about the reinforcing member 36 rather than in the tapered section.

From the foregoing, it will be appreciated that a diaphragm has been provided with a unique bead section adapted to perform a good connection and seal between associated parts of a cylindrical container particularly adapted for use as air springs of an automotive vehicle.

We claim:

1. In an automotive air suspension spring, the combination of a container and flexible diaphragm which includes a connection and seal between telescoped open ends thereof defined by lateral inwardly and outwardly extending flanges about said ends on said container and diaphragm respectively, the flange on said container defining with a wall thereof an inwardly facing annular groove, the flange on said diaphragm comprising a bead engaging the container flange and wall and having an outwardly extending ridge sealingly anchored in said groove.

2. A connection between open ends of a circular walled container and a flexible diaphragm comprising as a part of said container in cross-section, a channel on an end of said container wall whose web is offset therefrom and whose legs extend perpendicularly with respect thereto, a ring extending perpendicular to said container wall and having an end anchored in said channel and a dished portion spaced therefrom, said anchored end forming a groove with said container wall and a leg of said channel, and further comprising as a part of said diaphragm a flexible thin section having a bead section partially turned over to lap said thin section and embracing said dished portion with said thin section, said bead section including a reinforcing member in cross-section, and a cord fabric section in said bead and thin section wrapped around said reinforcing member, said bead including a second bead molded thereon and located in said groove.

3. In an automotive air suspension spring, the combination of a container and flexible diaphragm which includes a connection and seal between telescoped open ends thereof defined by lateral inwardly and outwardly extending flanges about said ends on said container and diaphragm respectively, the flange on said container defining with a wall thereof an inwardly facing annular groove, the flange on said diaphragm comprising a bead engaging the container flange and wall and having an outwardly extending ridge sealingly anchored in said groove, a reinforcing member imbedded in said bead, said bead including a longitudinally extending ring of tapering cross-section having thereon an outwardly facing cylindrical surface sealingly cooperating with an inner surface of said wall, said outwardly facing cylindrical surface being relieved between said ridge and the upper end of said ring to reduce the tendency upon flexure of said diaphragm for said ring to be drawn away from said container wall surface.

4. In an automotive air suspension spring, the combination of a container and flexible diaphragm which includes a connection and seal between telescoped open ends thereof defined by lateral inwardly and outwardly extending flanges about said ends on said container and diaphragm respectively, the flange on said container defining with a wall thereof an inwardly facing annular groove, the flange on said diaphragm comprising a bead engaging the container flange and wall and having an outwardly extending ridge sealingly anchored in said groove, a reinforcing member imbedded in said bead, said bead including a longitudinally extending ring of tapering cross-section having thereon an outwardly facing cylindrical surface sealingly cooperating with an inner surface of said wall, said outwardly facing cylindrical surface being relieved between said ridge and the upper end of said ring to reduce the tendency upon flexure of said diaphragm for said ring to be drawn away from said container wall surface, said wall and bead being formed of at least one ply of cord fabric coated with a fluid impermeable composition, the cords of said cord fabric being substantially inextensible and extending from one end of said diaphragm to said bead, one end of said fabric being wrapped around said reinforcing member so that upon flexure of said diaphragm the tension forces on said fabric tend to further secure said ridge in said groove.

References Cited in the file of this patent

UNITED STATES PATENTS

| 1,174,238 | Dowse | Mar. 7, 1916 |
| 1,754,836 | Schenuit | Apr. 15, 1930 |
| 1,966,580 | Bull | July 17, 1934 |
| 2,017,419 | Mercier | Oct. 15, 1935 |
| 2,394,401 | Overbeke | Feb. 5, 1946 |
| 2,578,730 | Nicholson | Dec. 18, 1951 |
| 2,703,517 | Hooper | Mar. 8, 1955 |
| 2,744,543 | Brady | May 8, 1956 |

FOREIGN PATENTS

| 4,274 | Great Britain | of 1897 |